(12) United States Patent  (10) Patent No.: US 8,215,580 B2
Balk  (45) Date of Patent: Jul. 10, 2012

(54) ATTACHMENT OF A MULTIFLOW TURBOJET ENGINE TO AN AIRCRAFT

(75) Inventor: Wouter Balk, Melun (FR)

(73) Assignee: SNECMA, Paris (FR)

( * ) Notice: Subject to any disclaimer, the term of this patent is extended or adjusted under 35 U.S.C. 154(b) by 627 days.

(21) Appl. No.: 12/358,862

(22) Filed: Jan. 23, 2009

(65) Prior Publication Data

US 2009/0189014 A1 Jul. 30, 2009

(30) Foreign Application Priority Data

Jan. 25, 2008 (FR) .................................. 08 00402

(51) Int. Cl.
B64D 27/00 (2006.01)
(52) U.S. Cl. ................. 244/54; 60/796; 60/797; 60/782
(58) Field of Classification Search .................... 244/54; 60/782, 797, 796
See application file for complete search history.

(56) References Cited

U.S. PATENT DOCUMENTS

| | | | |
|---|---|---|---|
| 4,022,018 A | | 5/1977 | Tuten et al. |
| 4,044,973 A | * | 8/1977 | Moorehead ...................... 244/54 |
| 4,458,863 A | * | 7/1984 | Smith ............................... 244/54 |
| 4,555,078 A | * | 11/1985 | Grognard ......................... 244/54 |
| 4,603,821 A | * | 8/1986 | White .............................. 244/54 |
| 4,997,145 A | * | 3/1991 | Hodgkinson ................... 244/54 |
| 5,319,922 A | * | 6/1994 | Brantley ......................... 60/797 |
| 5,385,013 A | * | 1/1995 | Barron et al. ................... 60/782 |
| 5,452,575 A | * | 9/1995 | Freid ............................... 60/797 |
| 5,746,391 A | * | 5/1998 | Rodgers et al. ................. 244/54 |
| 6,398,161 B1 | * | 6/2002 | Jule et al. ........................ 244/54 |
| 7,063,290 B2 | * | 6/2006 | Marche ........................... 244/54 |
| 7,156,343 B2 | * | 1/2007 | Marche ........................... 244/54 |
| 7,232,091 B2 | * | 6/2007 | Marche ........................... 244/54 |
| 7,797,947 B2 | * | 9/2010 | Lafont et al. .................... 60/796 |
| 2003/0173456 A1 | * | 9/2003 | Levert et al. .................... 244/54 |
| 2005/0194493 A1 | | 9/2005 | Marche |
| 2007/0138338 A1 | * | 6/2007 | Luo et al. ........................ 244/54 |
| 2008/0251633 A1 | * | 10/2008 | Journade et al. ................ 244/54 |
| 2008/0302907 A1 | * | 12/2008 | Schafer .......................... 244/54 |
| 2009/0056343 A1 | * | 3/2009 | Suciu et al. ..................... 60/797 |
| 2009/0084893 A1 | * | 4/2009 | Balk ............................... 244/54 |
| 2009/0266932 A1 | * | 10/2009 | Roche et al. .................... 244/54 |
| 2010/0127117 A1 | * | 5/2010 | Combes et al. ................. 244/54 |

FOREIGN PATENT DOCUMENTS

| | | |
|---|---|---|
| EP | 0 147 878 A1 | 7/1985 |
| EP | 1 571 081 A1 | 9/2005 |
| GB | 2 303 884 A | 3/1997 |

* cited by examiner

*Primary Examiner* — Michelle Clement
(74) *Attorney, Agent, or Firm* — Oblon, Spivak, McClelland, Maier & Neustadt, L.L.P.

(57) ABSTRACT

A suspension of a multi-flow turbojet engine provided with an intermediate casing and an exhaust casing from a pylon that can be attached to the structure of an aircraft is disclosed. The suspension includes a forward attachment device between the hub of the intermediate casing and the pylon, a rear attachment device between the exhaust casing and the pylon, and a connection device rigidly connecting the intermediate casing to the pylon. The rear attachment device includes an actuator for compensating for the variations in diameter of the exhaust casing so as to keep the axis of the exhaust casing coaxial with the axis of the intermediate casing through the various phases of flight of the aircraft.

8 Claims, 2 Drawing Sheets

ATTACHMENT OF A MULTIFLOW TURBOJET ENGINE TO AN AIRCRAFT

BACKGROUND OF THE INVENTION

The present invention relates to the attachment of a multi-flow turbojet engine to an aircraft by suspending it from the wing structure or any other structure thereof by means of a pylon.

A multi-flow turbojet engine comprises a turbojet consisting of a gas turbine engine driving a fan. The invention relates to the fan engines situated at the front. The air compressed by the fan is split into two or more concentric flows; an internal primary flow passes through the gas turbine engine being heated up in the combustion chamber then expanded in the turbine section which drives the air compression sections, before being discharged into the atmosphere. The other flow or flows remain cold; they are discharged directly into the atmosphere or alternatively are mixed beforehand with the gases of the primary flow and provide most of the thrust. The bypass ratio, which is the ratio between the flow rate of cold air and the flow rate of hot gas, in the case of engines for civil aviation is relatively high, and at the present time is commonly of the order of five to six. This type of engine comprises two structural casing elements via which the loads are transmitted between the aircraft and the engine, one at the front in the continuation of the fan casing, that forms the casing known as the intermediate casing, and the other at the rear, forming the exhaust casing. The engine is attached to the wing structure on two transverse suspension planes passing through these structural elements.

The attachment pylon or strut is a rigid structural component that forms the connection interface between the engine and the wing structure of the aircraft and, in particular, is connected to the engine in these two planes. It allows load to be transmitted from the engine to the structure of the aircraft. It also has the function of guiding auxiliaries. The pylon is generally an elongate structure of rectangular cross section of the box structure type. It is formed by assembling upper and lower spars and lateral panels joined together via transverse ribs. It comprises, on the one hand, means of attachment to the engine and, on the other hand, on its upper part, means of attachment to the wing structure of the airplane.

This type of engine attachment is used and works satisfactorily for engines with the kind of bypass ratio mentioned hereinabove.

Technological advances in engine technology lead to an increase in the bypass ratio with a view to doubling this in the future. This will result in a structural modification that could make the current means of attachment less suitable. This is because the diameter of the fan is increased while that of the part involving the primary flow does not progress to the same extent and remains at the same order of magnitude. The loads introduced along the axis of this type of engine, particularly when the aircraft is taking off, are then greater even though the central part downstream of the fan remains relatively flexible. No solution has been found nor even is any solution possible for making this more rigid. This results in deformations along the axis, bending, and misalignment of the rotary elements, all of this reducing engine performance.

DESCRIPTION OF THE PRIOR ART

Document US2005/0194493 has proposed reducing non-axisymmetric deformation of the engine by making the suspension of the engine statically indeterminate on the basis of a predetermined deformation of the engine that occurs particularly when the airplane is taking off. In cruising flight, the suspension remains statically determinate and works in the conventional way. A link rod connecting the fan casing to an element of the pylon used to suspend the engine from the wing structure forms a means that opposes longitudinal bending of the engine. The connection between the casing and the link rod is flexible such that the link rod remains on standby and is loaded only when the deformation of the fan casing exceeds a set amount.

SUMMARY OF THE INVENTION

The present invention proposes an improved solution.

Thus, in accordance with the invention, the suspension for suspending a multi-flow turbojet engine provided with an intermediate casing and an exhaust casing from a pylon that can be attached to the structure of an aircraft, comprising forward means of attachment between the hub of the intermediate casing and said pylon and a rear means of attachment between the exhaust casing and the pylon, is one which also comprises a means of connection rigidly connecting the intermediate casing to the pylon, and which is one wherein the rear means of attachment comprises a means for compensating for the variations in diameter of the exhaust casing so as to keep the axis of the exhaust casing coaxial with the axis of the intermediate casing through the various phases of flight of the aircraft.

The suspension of the invention is therefore of the statically indeterminate type with the rigid connection between the intermediate casing and the pylon. Some of these loads are transmitted to the pylon via this connection. It also avoids the problems that result from bending of the engine. Further, insofar as the engine also experiences deformations of a thermal origin, the invention is able to compensate for these, maintaining coaxiality between the fan and turbine shafts.

According to another feature, said means for compensating for the variations in diameter of the exhaust casing comprises an actuator capable of varying the distance from the exhaust casing to the pylon. This more particularly means the height of the exhaust casing relative to the pylon.

More specifically, said means for compensating for the variations in diameter is driven by a sensor that measures the coaxiality between the turbine and fan casing. This sensor according to one embodiment provides a signal representative of the fan blade tip clearance.

According to another embodiment, the sensor provides a measurement of the variation in height between the fan casing and the exhaust casing.

BRIEF DESCRIPTION OF THE DRAWINGS

One embodiment of the suspension of the invention will now be described with reference to the drawings in which.

DESCRIPTION OF THE PREFERRED EMBODIMENT

Figure 1:
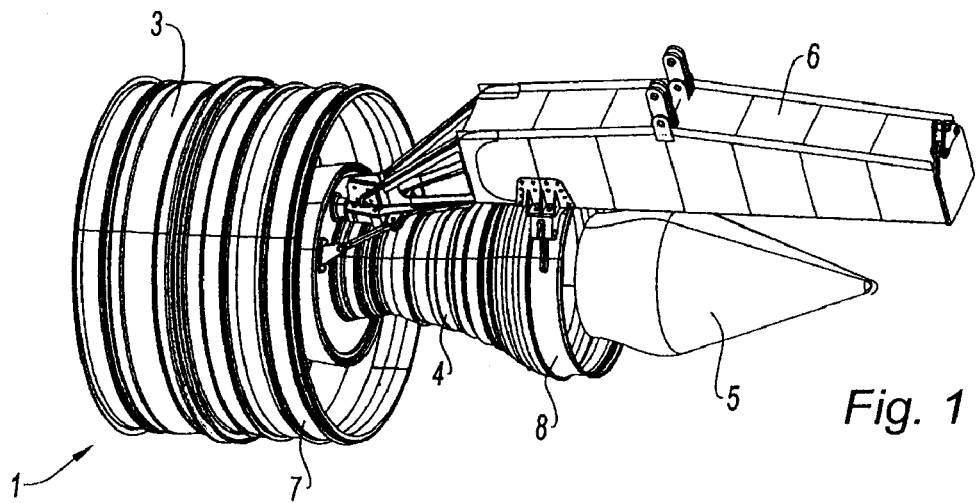
FIG. 1 depicts a perspective view of how a bypass turbojet engine is attached under a wing according to the prior art.

The engine depicted in FIG. 1 is a bypass turbojet engine 1 with a fan at the front, rotating about the axis XX of the engine in the fan casing 3, and is not visible. Downstream, that part of the engine that is termed the core comprising the compression stages downstream of the fan, the combustion chamber and the turbine stages, is housed inside a casing assembly known as the primary flow casing 4. The part of the engine downstream of the primary flow casing comprises the bullet 5. The engine is suspended or attached under the wing of an aircraft via a substantially parallelepipedal and non-deformable rigid element that forms the pylon 6. Engine attachment is afforded by two structural casing elements: the intermediate casing 7 at the front and the exhaust casing 8. The intermediate casing 7 lies in the continuation of the fan casing 3. It comprises an external shell ring, and a hub, these two being connected by radial arms. The hub supports the front bearings of the concentric rotary shaft or shafts of the machine. There are two or more concentric shafts in the case of a twin-spool engine or more generally of a multi-spool engine. The exhaust casing 8 is situated downstream of the casing for the primary flow stream. It comprises an external shell ring connected by arms to a hub supporting the rear bearings.

As can be seen from FIG. 1, the engine is suspended or attached in two transverse planes which are located at the two structural elements 7 and 8 of the casing. According to this method of suspension, attachment is performed at the hub of the intermediate casing 7 via a forward means 71 of attachment and at the external shell ring of the exhaust casing via a rear means 81 of attachment, these means consisting of a collection of link rods and links. The loads are distributed between the front and rear of the engine in such a way as to transmit load between the engine and the aircraft along the six axes of translation and of rotation. How the link rods are assembled in order to perform this function is not described in greater detail as it does not form part of the invention.

Insofar as the forward attachment has elements with ball joint connections, it does not react the bending moments applied along the axis of the engine by the fan as a whole if the aircraft is taking off or in a nose-up attitude, for example. These loads, when the ratio between the diameters of the fan casing and of the primary stream flow casing is high, are liable to give rise to deformation leading to losses in performance.

One feature of the invention therefore proposes giving the forward attachment the ability to react to a bending moment about a transverse axis.

Figure 2:
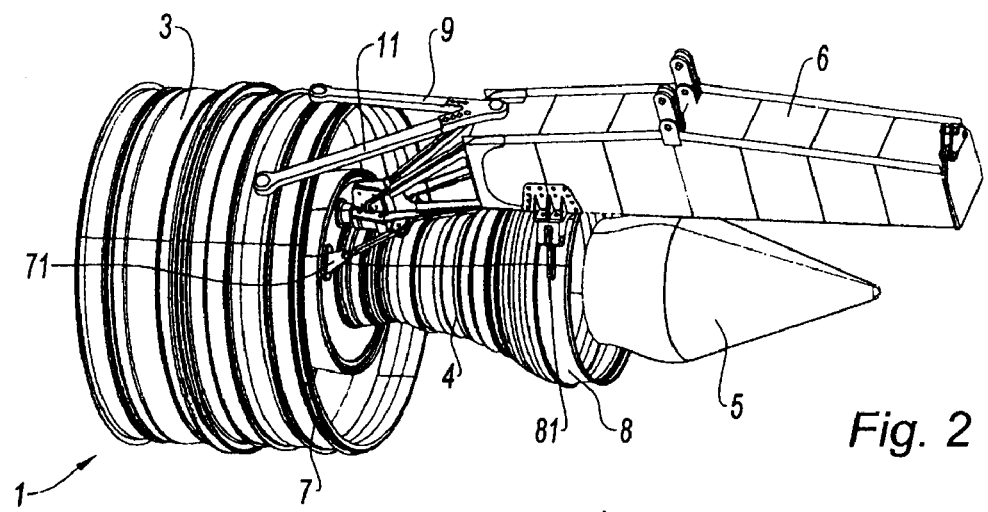
FIG. 2 shows the attachment of a bypass turbojet engine under the wing using a statically indeterminate link.

FIG. 2 shows the same engine as before but with a modified attachment. The modification has been to create a third suspension point using the two link rods 9 and 11. Here, the link rods are attached at the upstream end to the external shell ring of the intermediate casing and at the downstream end to the pylon 6. The position is that of a V with the opening toward the front, but other configurations are possible.

The other means of suspension are the same as before.

By virtue of this additional connection, the bending loads are reacted by the pylon directly.

Figure 3:
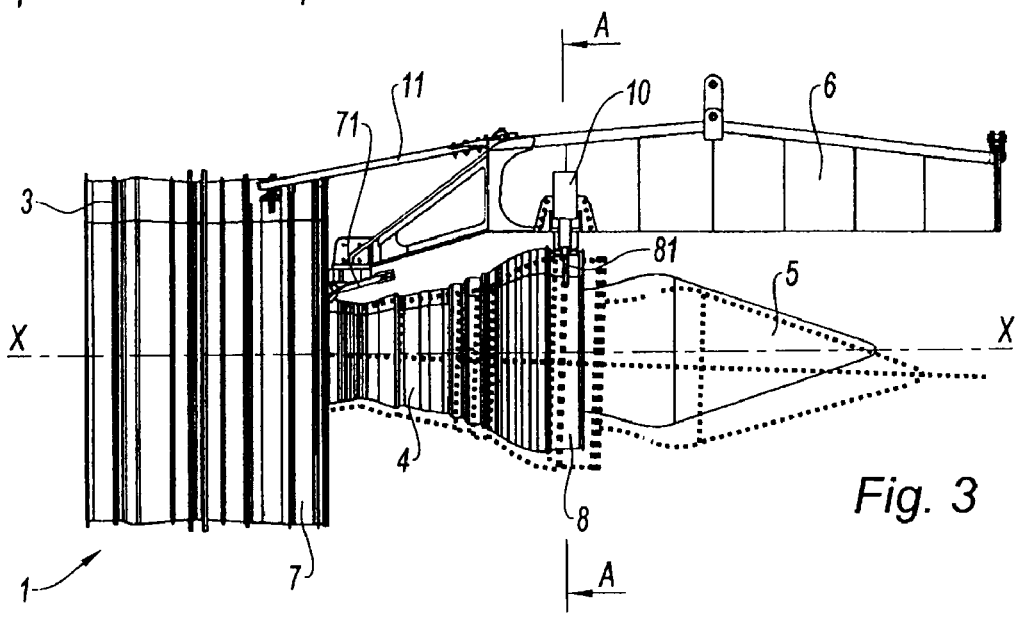
FIG. 3 shows a side view of the engine equipped with the means of the invention and the deformation of the engine axis caused by expansion of the exhaust casing.

The mere fact of securing the fan casing to the pylon is not enough in transient engine speed phases. This is because, as has been depicted in dotted lines in FIG. 3, the axis of the engine downstream of the fan may not always be aligned with the axis of the fan. In a suspension of the prior art, the point of attachment to the exhaust casing is fixed in terms of height relative to the pylon regardless of engine speed. The link rods connecting the exhaust casing to the spar attached to the pylon are admittedly articulated via ball joints in order to provide a statically determinate connection, but the way in which they are assembled with degrees of freedom in the axial direction and radial expansion does not create any degree of freedom along the vertical axis.

During changes in engine speed, there are dimensional variations particularly of those parts of the engine subject to variations in engine gas temperature. These variations result in expansion of the exhaust casing and a vertical shift of the engine axis with respect to the pylon.

In order to solve this problem, the invention creates a suspension with an element that is active in the vertical direction between the exhaust casing and the pylon. The purpose of this element is to shorten the distance between the pylon and the casing when the latter expands, so as to keep the fan and turbine axes coaxial.

Figure 4:
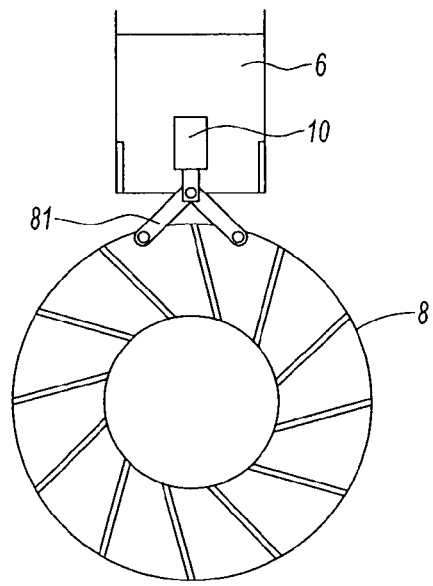
FIG. 4 shows a section on AA through the actuator and the rear suspension of the engine, and FIG. 5 schematically shows how the hydraulic actuator is controlled.

The active element advantageously consists of an actuator 10 of which one end is, as can be seen in FIG. 4, secured to the pylon 6, preferably housed in the box structure of the pylon, and of which the other end can move relative to the first and is connected to the suspension 81, itself attached to the exhaust casing 8. The suspension 81 in this instance is made up of two links mounted using ball joints.

Figure 5:
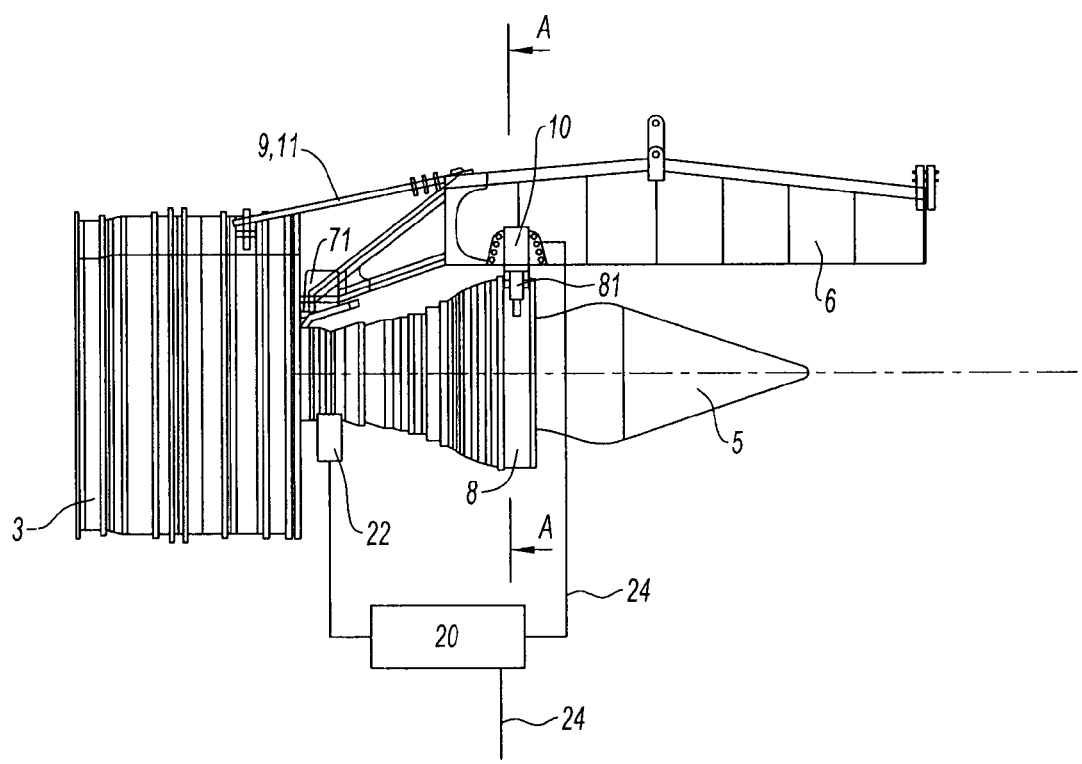

According to one embodiment, as is depicted in FIG. 5, the supply 24, of motive fluid for example in the case of a hydraulic actuator 10, is controlled by a valve 20 which is driven by a sensor that delivers a control signal for the valve and that measures the coaxiality between the fan casing and the turbine.

This sensor may be positioned on the turbojet engine compressor at the high-pressure stages and deliver a signal that is a function of the blade tip clearance, using electrical capacitance for example. This is the clearance between the distal end of the compressor blades and the casing that delimits the airstream. In a variation in speed, this clearance varies according to the difference in expansion between the moving parts and the fixed parts of the compressor. This clearance is therefore an indicator of the expansion of the exhaust casing; the signal supplied by the sensor is input into the actuator control circuit. The height can thus be modified in such a way that the axis of the turbine is kept coaxial with that of the fan.

Other means of driving the actuator are conceivable. For example, use may be made of a sensor that measures the angle made by the axis of the turbine shaft and the axis of the fan, and the actuator may be slaved to this measured angle.

Likewise, any other type of actuator or equivalent means may be used.

The invention claimed is:

1. A suspension for suspending a multi-flow turbojet engine provided with an intermediate casing and an exhaust casing from a pylon that can be attached to the structure of an aircraft, comprising:
   a forward attachment device attaching a hub of the intermediate casing to the pylon;
   a rear attachment device attaching the exhaust casing to the pylon; and
   a connection device rigidly connecting the intermediate casing to the pylon,
   wherein the rear attachment device includes an actuator which varies a vertical distance between the exhaust casing and the pylon to compensate for variations in diameter of the exhaust casing so as to keep an axis of the exhaust casing coaxial with an axis of the intermediate casing through the various phases of flight of the aircraft, a first end of the actuator is secured to the pylon and a second end of the actuator, movable relative to the first end in a vertical direction, is connected to the rear attachment device.

2. The suspension as claimed in claim 1, wherein said actuator is driven by a sensor that supplies a control signal representing the coaxiality of the engine.

3. The suspension as claimed in claim 2, wherein the sensor provides a signal representative of a measured fan blade tip clearance.

4. The suspension as claimed in claim 2, wherein the sensor provides a signal representative of a measured angle between an axis of the turbine and the axis of the intermediate casing.

5. The suspension as claimed in claim 2, wherein the actuator is a hydraulic actuator, and a supply of fluid to the hydraulic actuator is controlled by a valve driven by the sensor.

6. The suspension as claimed in claim 1, wherein the connection device rigidly connecting the intermediate casing to the pylon comprises two link rods attached at an upstream end to an external shell ring of the intermediate casing and at a downstream end to the pylon.

7. A turbojet engine equipped with a suspension as claimed in any of claims 1 or 2 to 6.

8. The suspension as claimed in claim 1, wherein the actuator is a hydraulic actuator.

* * * * *